Dec. 25, 1956  H. E. ALTGELT  2,775,183
OVERLOAD TRIP DEVICE FOR PLOWS
Filed May 28, 1953  2 Sheets-Sheet 1

INVENTOR.
HERMAN E. ALTGELT
BY
ATTORNEYS

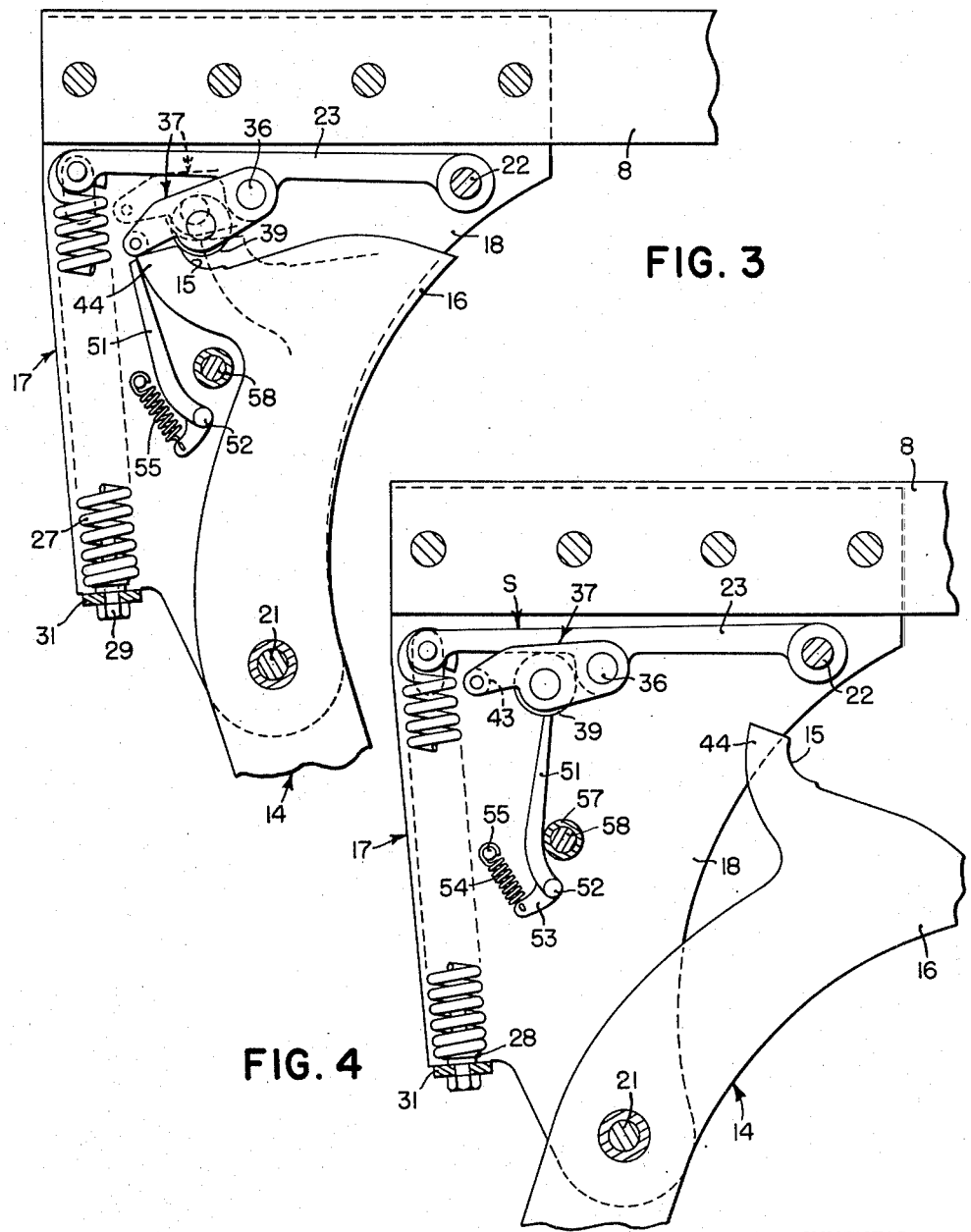

United States Patent Office

2,775,183
Patented Dec. 25, 1956

2,775,183

OVERLOAD TRIP DEVICE FOR PLOWS

Herman E. Altgelt, Moline, Ill., assignor to Deere & Company, Moline, Ill., a corporation of Illinois Application May 28, 1953, Serial No. 357,983

11 Claims. (Cl. 97—47.89)

The present invention relates generally to agricultural implements, and more particularly to ground-working implements such as plows and the like having ground-working tool means operating below the surface of the ground, which tool means may be damaged by continued forward travel of the implement after one or more of the tool means encounters an obstruction, such as a large stone or boulder, stump, root or the like.

The object and general nature of the present invention is the provision of an agricultural machine of the ground-working type, such as a plow or the like, having overload release means so constructed and arranged that the ground-working tool is automatically released upon the occurence of an overload of substantial magnitude.

More specifically, it is a feature of this invention to provide a toggle linkage so constructed and arranged that the ground-working tool is held to its work by the arrangement of the toggle linkage in an almost but not quite straight-line position, with the load-adjusting means operating against the toggle joint at a mechanical advantage. However, upon the occurrence of an overload of such magnitude that the toggle links begin to move toward their broken position, and, according to the present invention, as soon as the toggle links start to buckle, means is provided for completely disengaging the tool from the toggle linkage with a positive action. Thus, the response of the overload toggle release of this type is, to a large extent, independent of variations that may occur in the toggle joint, such as accumulations of dirt, dust, rust and the like in the contacting surfaces.

Specifically, therefore, it is an object of the present invention to provide an overload release mechanism which is so constructed and arranged that just as soon as the mechanism starts to yield, as under overload, the tool is disconnected completely from the overload linkage with a positive and definite movement.

These and other objects and advantages of the present invention will be apparent to those skilled in the art after a consideration of the following detailed description, taken in conjunction with the accompanying drawings.

In the drawings:

Figure 1 is a side view of a tractor-mounted plow in which the principles of the present invention have been incorporated, it being understood that the present invention is not necessarily limited, especially in its broader concepts, to plows or the like.

Figure 3 is a view similar to Figure 2, showing in full lines the parts in the positions they occupy substantially at the beginning of the releasing action and in dotted lines the positions of the parts at about the moment disconnection is substantially completed.

Figure 4 shows the parts after disconnection has been completed but with the overload trip mechanism held in a position facilitating return of the parts to their normal position.

Figure 1:
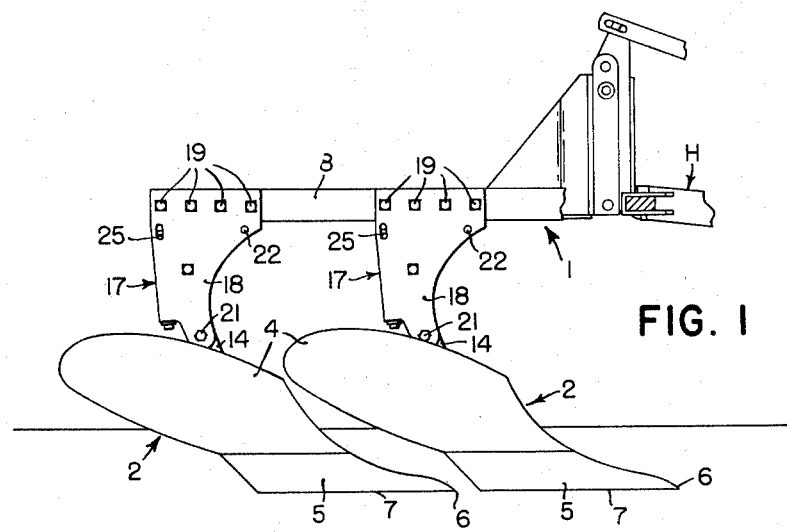

Referring first to Figure 1, the invention has been shown as incorporated in a tractor-carried plow, in which the tractor is provided with suitable hitch means H for receiving a plow frame 1 to which a plow bottom or bottoms 2 are rigidly connected. The plow bottoms 2 are of the moldboard type, each including a moldboard 4 and a plowshare 5 having a forwardly extending plow point 6 and a generally rearwardly and forwardly extending cutting edge 7. Each plow bottom is mounted on the rear end of a generally fore-and-aft extending plow beam, the beam or beams 8 forming the principal part of the frame 1.

Figure 2:
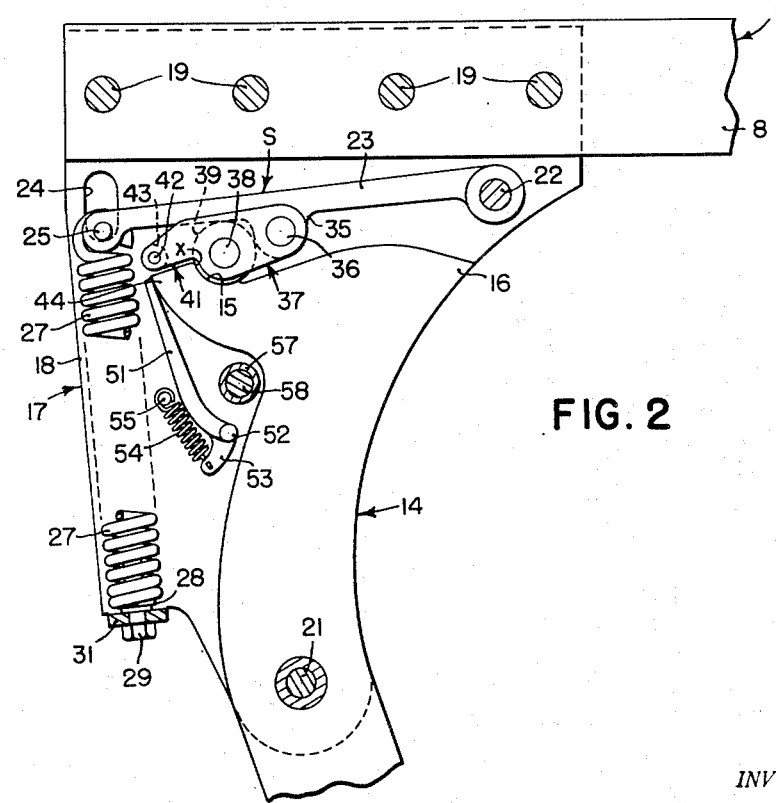
Figure 2 is an enlarged fragmentary detail view of one form of safety trip mechanism incorporated in the plow shown in Figure 1.

Each of the plow bottoms 2 is fixed, as by a plurality of bolts (not shown) or the like, to the lower end of a generally vertically extending plow standard 14. Each standard 14 comprises a generally vertically extending part curved, as best shown in Figure 2, and having a notch 15 and a forward extension 16 at its upper end.

Secured to the rear end of each plow beam 8 is a bracket structure 17 in the form of a pair of depending bracket plates 18 secured along their upper edge portions by bolts 19 to the associated beams 8. The lowermost portions of the bracket plates 18 are apertured to receive pivot means 21 by which the associated plow standards 14 are pivotally connected to the bracket structures 17 for generally fore-and-aft swinging movement. The upper portions of the bracket plates 18 are of sufficient fore-and-aft dimension to receive the several parts of the safety trip mechanism S with which the present invention is more particularly concerned.

The upper forwardmost portions of the bracket plates 18 are apertured to receive a forward pivot member 22 upon which a link or arm 23, forming a part of the safety trip mechanism S, is pivotallly mounted at its forward end. The upper rearmost portions of the bracket plates 18 are provided with vertical slots 24, and a cross pin 25 that is fixed to the rear end of the link or arm 23 is movable vertically within the slots 24, the lower ends of the slots 24 cooperating with the pin 25 to form stop means limiting the downward movement of the rear end of the link or arm 23. A relatively heavy spring 27 forms a resilient load-resisting element and is connected at its upper end to the rear end of the arm 23 through the crosspin 25. The arm 23 and spring 27, taken together as a unit, comprise force-opposing means, acting normally to oppose movement of the tool standard 14. At its lower end, the spring is threaded onto an attachment block 28 that is secured, as by a cap screw 29, to a cross piece 31 carried by the bracket plates 18, which thus form a supporting bracket for the force-resisting element 27. The intermediate portion of the link arm 23 is provided with an apertured boss 35, in which a pivot 36 is carried. Connected with or secured to the pivot 36 is a link 37 that is made up of a pair of side plates connected with or fixed to the pivot 36, the rear end of the link member 37 carrying pivot means 38 on which a roller 39 is rotatably mounted. The roller 39 is adapted to seat in the notch 15 of the rockable standard 14. The rear end of the side plates are formed so as to provide a rear extension 41 interconnected by a pin 42 on which a roller 43 is mounted. The roller 43 is adapted to contact a rearward extension 44 carried by the upper rear portion of the standard 14. The tool standard extension 44 forms, in effect, an abutment means mounted on the supporting bracket 17 and positioned to receive the roller 43 on the toggle link extension 41.

The operation of the device of the present invention as so far described is substantially as follows.

Figures 1 and 2 show the parts in the various positions they occupy under normal operating conditions. The axis of the pivot pin 36 lies an appreciable distance above the line joining the center of the pivot 38 and the center of the pivot 22, and the roller 39 is firmly seated in the socket 15, the circumferential extent of contact between the notch 15 and the roller 39 being such that in this position, the roller 39 is securely retained in the notch 15; that is, a line extending from X (Figure 2), the highest point of contact between the notch 15 and the adjacent portion of the roller 39, to the center of the pivot 38, lies generally perpendicular to a line extending from X down to the center of the pivot 21, whereby there is substantially no tendency for the roller 39 to be forced out of the notch 15. However, a line extending from the center of the pivot 38 to the center of the pivot 36 extends upwardly and forwardly relative to a line extending forwardly from pivot 38 to the center of pivot 22, whereby there is an upwardly directed component of force tending to shift the link or arm 23 upwardly against the tension of the spring 17. Thus, an abnormal force or load imposed on the lower end of the standard 14 tends to swing the arm or link 23 upwardly and the link 37 in a generally counterclockwise direction, as viewed in Figure 2. However, after the link 37 has moved more than a small amount, the rear end 41 swings downwardly until the roller 43 engages the abutment edge of the section 44, whereupon further force applied through the upper end of the arm 14 to the roller 39 shifts the link 37 in a counterclockwise direction and additionally raises the link or arm 23. This angular movement of the link 23 then acts through the rear extension or arm 41 and the roller 43 to begin to raise the roller 39 bodily out of the notch 15. During this pivotal action of the link 37, the roller 39 remains seated in the notch 15 until the counterclockwise movement of the arm 37 begins to raise the roller 39 to the point, as indicated in full lines in Figure 3, where the link 37 starts to move from its full-line position to its dotted-line position. In the latter position the roller 37 is completely disengaged from the notch 15 and the upper end of the standard 14 is then free to swing forwardly away from the trip means S. During the first movement of the toggle link 37, it pivots about the part 38 until the roller 43 contacts the extension 44.

An arm 51 is pivoted, as at 52, in between the bracket plates 18 at the rear side of the upper end of the plow standard 14. An extension 53 on the arm 51 receives one end of a spring 54, the other end of which is anchored, as by a stud 55, to one or both of the bracket plates 18. Thus, as the upper end of the standard 14 starts to move forwardly, the upper end of the arm 51 follows it until the forward face of the arm 51 engages a sleeve 57 surrounding a connecting bolt 58 that forms a part of the bracket structure 17. The parts are so arranged that, when the arm 51 engages the stud or sleeve 57, the upper end of the arm 51 lies immediately below the roller 39. Therefore, as soon as the upper end of the plow standard 14 moves farther forwardly, the roller 39 settles down upon the end of the arm 51, which thus holds the roller 39 in a position to facilitate the return of the standard 14 to its normal position.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A safety device for a ground-working tool movably mounted on a frame means, said device comprising a part movable with said tool, a toggle linkage comprising pivotally interconnected links, one pivotally anchored at one end to said frame means and the other link releasably connected with said part, resilient means opposing buckling of said toggle linkage, and means connected to move with one of said toggle links and adapted to act against said part in response to buckling movement of said toggle linkage for completely disengaging said releasable link from said part.

2. A safety device as defined in claim 1, further characterized by said part having a notch and said one toggle link having a roller releasably disposed in said notch, and said buckling-responsive means acting to move said roller out of said notch.

3. A safety device for a ground-working tool that is movably connected with a support, said device comprising a link pivoted at one end to said support, resilient force-opposing means connected to act between said support and the other end of said link, a second link pivoted at one end to said first link between the ends of the latter, a releasable pivotal connection between said second link and said tool, a line connecting said releasable pivotal connection with the point of connection of said first link with said support extending at one side of the pivot between said first and second links, and an arm on said second link, angular movement of said second link acting through said arm when said links buckle, as under overload, for disconnecting said releasable connection.

4. A safety device for a movably mounted ground-working implement, comprising a support, a tool-receiving standard pivoted to said support and having a notch, a spring biased arm pivoted to said support adjacent said standard, a link pivoted at one end to said arm and carrying standard-engaging means releasably disposed on said notch, and means connected to move with said link and engageable with said stanadrd for moving said standard-engaging means out of engagement with said notch.

5. In a ground-working means, a supporting bracket, a tool standard pivoted to said bracket, an arm pivotally connected with said bracket and including spring means acting against said bracket for yieldably opposing movement of said arm in one direction, a link pivotally connected at one end with said arm and releasably connected at its other end with said standard, said link and arm serving as a toggle linkage adapted to buckle, when subjected to an overload, and means responsive to movement of said arm during said buckling movement for disconnecting said link from said standard, thereby freeing the latter.

6. A spring trip device comprising a support, a tool standard pivoted thereto, a pair of interconnected toggle links connected at one end with said support and at the other end engaging said standard, spring means acting against said toggle links to yieldingly resist buckling of said toggle links, and means actuated by angular movement of one of said links, as under overload, and engageable with said tool standard at a point spaced from the point of connection of said toggle links therewith to disconnect said other end of said links from said standard.

7. A spring trip device comprising a support, a tool standard pivoted thereto, an arm pivoted at one end to said support, load-resisting means connected to the other end of said arm, a link pivoted to said arm at a midpoint thereon and engaging said standard, and an extension on said link engageable with said standard for freeing the link from connection with the standard upon the occurrence of an overload.

8. A spring trip device comprising a support, a tool standard pivoted thereto, said standard having a notch, an arm pivoted at one end to said support, load-resisting means connected to the other end of said arm, a link pivoted to said arm at a midpoint thereon, a roller on said link seating in said notch, and means connected with said link and responsive to movement of said link for moving said roller out of said notch.

9. A spring trip device comprising a support, a tool standard pivoted thereto, said standard having a notch, an arm pivoted at one end to said support, load-resisting means connected to the other end of said arm, a link pivoted to said arm at a midpoint thereon, a roller on said link seating in said notch, and an extension on said link engageable with said standard for freeing the roller from said notch upon the occurrence of an overload.

10. A safety device for a ground-working tool, comprising resilient force-opposing means, a link pivotally carried in supported relation at one point on said means and releasably connected in force transmitting relation at a second point with said tool, and a portion rigidly supported by said link and carrying means positioned to engage said tool at a third point spaced from said second point, whereby angular displacement of said link, as under an overload, acts at said third point to disengage said link from said tool at said second point.

11. A safety device for a ground-working tool, said device comprising an arm, resilient means acting against said arm, said arm being connected at one portion to said means, means including a part swingable relative to said arm for releasably connecting another portion of said arm with said tool to receive the ground-working reaction thereof, and means on said swingable part and engageable with said tool in response to swinging movement of said part, as by an overload on said resilient means, whereby movement of said tool relative to said part disengages the latter from said tool.

References Cited in the file of this patent
UNITED STATES PATENTS

| 545,987 | Van Brunt | Sept. 10, 1895 |
| 1,808,477 | Printz | June 2, 1931 |
| 1,808,478 | Printz | June 2, 1931 |
| 2,331,686 | Hintz | Oct. 12, 1943 |

FOREIGN PATENTS

| 90,883 | Sweden | Nov. 23, 1937 |